(12) United States Patent
Sato et al.

(10) Patent No.: US 7,582,042 B2
(45) Date of Patent: Sep. 1, 2009

(54) HYDRAULIC CONTROL APPARATUS FOR AUTOMATIC TRANSMISSION

(75) Inventors: Nobuhiro Sato, Anjo (JP); Takuya Fujimine, Anjo (JP); Kazuyuki Noda, Anjo (JP); Minoru Todo, Anjo (JP); Kazuhisa Ozaki, Anjo (JP); Kazutoshi Nozaki, Togo (JP); Masafumi Kinoshita, Toyota (JP); Atsushi Honda, Seto (JP); Akiharu Abe, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 368 days.

(21) Appl. No.: 11/452,325

(22) Filed: Jun. 14, 2006

(65) Prior Publication Data

US 2007/0169753 A1    Jul. 26, 2007

(30) Foreign Application Priority Data

Jun. 14, 2005    (JP)    ............................. 2005-173972

(51) Int. Cl.
*F16H 61/26*    (2006.01)
*F16D 33/00*    (2006.01)

(52) U.S. Cl. ...................................... 477/158; 192/3.29

(58) Field of Classification Search ................. 477/156, 477/158, 159, 160, 161, 180; 475/120, 127; 192/3.57, 3.58, 3.59, 3.29

See application file for complete search history.

(56) References Cited

U.S. PATENT DOCUMENTS

| | | | | |
|---|---|---|---|---|
| 5,842,953 | A | * | 12/1998 | Yasue et al. .................. 477/174 |
| 6,019,700 | A | * | 2/2000 | Imai et al. ...................... 477/45 |
| 6,689,006 | B2 | * | 2/2004 | Kaizu .......................... 475/127 |
| 7,341,133 | B2 | | 3/2008 | Ando et al. |
| 2001/0004621 | A1 | * | 6/2001 | Suzuki et al. ................ 477/168 |
| 2004/0229728 | A1 | * | 11/2004 | Oshima et al. .............. 477/176 |

FOREIGN PATENT DOCUMENTS

| | | | |
|---|---|---|---|
| JP | 02001012589 A | * | 1/2001 |
| JP | A 2003-042287 | | 2/2003 |
| JP | A-2006-052747 | | 2/2006 |

* cited by examiner

*Primary Examiner*—Roger Pang
(74) *Attorney, Agent, or Firm*—Oliff & Berridge, PLC

(57) ABSTRACT

A hydraulic control apparatus for an automatic transmission comprises a linear solenoid valve for outputting a control pressure, a primary regulator valve for regulating a line pressure in accordance with the control pressure, and a secondary regulator valve for regulating a secondary pressure in accordance with the control pressure, the secondary pressure being supplied to a lock-up clutch and a torque converter. A spool of the secondary regulator valve is formed to comprise a large diameter portion and a small diameter portion, thereby eliminating the need for components such as a sleeve, and the line pressure can be input into an oil chamber formed between the large diameter portion and small diameter portion.

14 Claims, 4 Drawing Sheets

HYDRAULIC CONTROL APPARATUS FOR AUTOMATIC TRANSMISSION

CROSS-REFERENCE TO RELATED APPLICATION

The disclosure of Japanese Patent Application No. 2005-173972 filed on Jun. 14, 2005, from which priority is claimed, including specification, drawings and abstract, is incorporated herein by reference in its entirety.

BACKGROUND

The invention relates to a hydraulic control apparatus for an automatic transmission installed in a vehicle or the like, for example, and more particularly to a hydraulic control apparatus for an automatic transmission in which a secondary pressure from a second pressure regulating valve is supplied to a torque converter and a lock-up clutch.

Typically, an automatic transmission installed in a vehicle or the like, for example, is provided with a hydraulic transmission apparatus for hydraulically transmitting the output of an engine to an input shaft of a speed change mechanism. In other words, the hydraulic transmission apparatus is provided with a torque converter which is capable of permitting a rotation speed difference between an output shaft (crankshaft) of the engine and the input shaft of the speed change mechanism. In recent years, to achieve reductions in fuel consumption and so on, more and more hydraulic transmission apparatuses for automatic transmissions are being provided with a lock-up clutch that is capable of directly coupling (locking up) the output shaft of the engine and the input shaft of the speed change mechanism.

Incidentally, an automatic transmission is provided with a clutch and a brake for forming a power transmission path of a transmission gear mechanism, and a hydraulic control apparatus for controlling the engagement and disengagement of the clutch and brake. The hydraulic control apparatus is provided with a solenoid valve which outputs a control pressure in accordance with a throttle opening, and a primary regulator valve which is controlled on the basis of the control pressure. A line pressure corresponding to the throttle opening is regulated by the solenoid valve and primary regulator valve, and the line pressure is supplied to a hydraulic servo or the like, of the clutch and brake. Meanwhile, to achieve an improvement in the durability of the torque converter in particular, a secondary regulator valve, which is likewise controlled on the basis of the control pressure, generates a secondary pressure obtained by reducing the line pressure, and supplies the torque converter and lock-up clutch with this secondary pressure.

However, in cases such as when the engine output is great, for example, and the required transfer torque capacity of the lock-up clutch is large, the secondary pressure must be raised, or in other words, the line pressure is unnecessarily increased, and this may adversely affect the fuel economy and so on. To solve this problem, it has been proposed that the control pressure from the aforementioned solenoid valve be input into the two oil chambers of the secondary regulator valve simultaneously, thereby raising the gain of the secondary regulator valve so as to prevent unnecessary increases in the line pressure (see Japanese Unexamined Patent Application Publication 2003-42287, for example).

A brief description of an example of a conventional hydraulic control apparatus for an automatic transmission will now be provided. FIG. 4 is a view showing an example of a conventional hydraulic control apparatus for an automatic transmission.

The automatic transmission comprises a hydraulic transmission apparatus 4 having a torque converter 2 and a lock-up clutch 3. As shown in FIG. 4, a hydraulic control apparatus 50 for the automatic transmission is constituted by a strainer 5, an oil pump 6, a linear solenoid valve SLT, a solenoid valve S1, a primary regulator valve 7, a secondary regulator valve 58, a lock-up relay valve 59, a lock-up control valve 10, a check valve 12, an orifice 19, an oil cooler 30, and a lubricating oil passage (LUBE) 31.

When the oil pump 6 is driven by the driving force of an engine, not shown in the drawing, for example, oil is aspirated from an oil pan, not shown in the drawing, via the strainer 5 such that oil pressure is supplied to the primary regulator valve 7 via an oil passage a1. Further, a modulator pressure $P_{MOD}$ is input into the linear solenoid valve SLT from a modulator valve, not shown in the drawing, and on the basis of the throttle opening, the linear solenoid valve SLT outputs a control pressure $P_{SLT}$ to oil passages c1, c2, c3, c4 through an output port SLTb. A spool position of the primary regulator valve 7 is then adjusted by the urging force of a spring 7s, the control pressure $P_{SLT}$ input into an oil chamber 7a thereof via the oil passage c2, and a feedback pressure input into an oil chamber 7b thereof, whereby the primary regulator valve 7 regulates the oil pressure in oil passages a1, a2, a3, a4 to a line pressure $P_L$ corresponding to the throttle opening while regulating the oil pressure that is returned to the oil pump 6 via an oil passage d1.

Meanwhile, the secondary regulator valve 58 is structured such that a spool 58p, a spring 58s, a plunger 58j, and a lid portion 58g having a sleeve portion 58i are inserted into a valve hole 22 formed in a valve body 20 in the direction of an arrow X, and the lid portion 58g is fixed to the valve body 20 by a key 58h, thereby forming a first oil chamber 58a, a second oil chamber 58b, and a third oil chamber 58c. A land portion 58p/1 of the spool 58p and the plunger 58j are formed with an outer diameter D3, while a land portion 58p/2, a land portion 58p/3, and a land portion 58p/4 are formed with an outer diameter D4.

When the lock-up clutch 3 is set in a state of release, the solenoid valve S1 is controlled such that a signal pressure $P_{S1}$ is not output, and thus a spool 59p of the lock-up relay valve 59 is set in a position on the left half of the drawing, whereby the control pressure $P_{SLT}$ supplied by the linear solenoid valve SLT through the oil passage c4 is blocked by the lock-up relay valve 59. As a result, the secondary regulator valve 58 receives only the control pressure $P_{SLT}$, which is input into the first oil chamber 58a via the oil passage c3, and the feedback pressure, which is input into the second oil chamber 58b.

The position of the spool 58p of the secondary regulator valve 58 is then adjusted by the urging force of a spring 58s, the control pressure $P_{SLT}$ input into the first oil chamber 58a, and the feedback pressure input into the second oil chamber 58b, whereby the secondary regulator valve 58 regulates the oil pressure in oil passages b1, b2, b3, b4, b5, b6, which are connected to a port 58f, in accordance with the throttle opening to a secondary pressure $P_{SEC}$ that is much lower than the line pressure $P_L$ while regulating the oil pressure that is returned to the oil pump 6 through a port 58d via an oil passage d2.

Note that the secondary pressure in this state is regulated to a lower pressure than the secondary pressure when the lock-up clutch 3 is engaged, as will be described below, and is therefore referred to as a low secondary pressure $P_{SEC}Lo$. Further, assuming that the pressure receiving area of the outer diameter D3 is A3 (i.e. $D3^2\pi/4$) and the urging force of the spring 58s is $F_{SP}$, the low secondary pressure $P_{SEC}$Lo may be expressed by the formula $A3*P_{SEC}Lo=A3*P_{SLT}+F_{SP}$, whereby $P_{SEC}Lo=P_{SLT}+F_{SP}/A3$, and therefore the gain of the secondary regulator valve 58 (the input/output ratio of the secondary pressure $P_{SEC}$ to the control pressure $P_{SLT}$) is 1.

The low secondary pressure $P_{SEC}$Lo is supplied to the torque converter 2 through the oil passage b5 via the lock-up relay valve 59. Since the low secondary pressure $P_{SEC}$Lo, which is much lower than the line pressure $P_L$, is supplied to the torque converter 2, high pressure is not applied to the torque converter 2, leading to an improvement in its durability. Furthermore, the low secondary pressure $P_{SEC}$Lo is regulated according to the throttle opening, and hence when the engine output rises in accordance with the throttle opening, the torque transfer capacity of the torque converter 2 also rises or increases, enabling normal torque transfer.

When the lock-up clutch 3 is engaged, on the other hand, the solenoid valve S1 is controlled such that the signal pressure $P_{S1}$ is output, and thus the spool 59p of the lock-up relay valve 59 is set to a position as indicated by the right half position of the lock-up relay valve 59 in FIG. 4 of the drawings. As a result, a port 59l and a port 59m of the lock-up relay valve 59 communicate with each other such that the control pressure $P_{SLT}$ supplied from the linear solenoid valve SLT through the oil passage c4 is input into the third oil chamber 58c of the secondary regulator valve 58 via an oil passage t1. Thus the secondary regulator valve 58 receives the control pressure $P_{SLT}$, which is input into the first oil chamber 58a, the feedback pressure, which is input into the second oil chamber 58b, and the control pressure $P_{SLT}$, which is input into the third oil chamber 58c.

The control pressure $P_{SLT}$ input into the third oil chamber 58c acts to depress the spool 58p in a direction, as indicated by the arrow X in FIG. 4, in accordance with the difference between the pressure receiving areas of the plunger 58j having the outer diameter D3 and the land portion 58p/4 having the outer diameter D4. As a result, the oil pressure that is returned to the oil pump 6 through the port 58d via the oil passage d2 is throttled, and the oil pressure in the oil passages b1, b2, b3, b4, b5, b6 connected to the port 58f is regulated in accordance with the throttle opening to a higher secondary pressure ("high secondary pressure" hereafter) $P_{SEC}$Hi than the low secondary pressure $P_{SEC}$Lo.

Assuming that the pressure receiving area of the outer diameter D3 is A3 (i.e. $D3^2\pi/4$), the pressure receiving area of the outer diameter D4 is A4 (i.e. $D4^2\pi/4$), and the urging force of the spring 58s is $F_{SP}$, the high secondary pressure $P_{SEC}$Hi may be expressed by the formula $A3*P_{SEC}Hi=A3*P_{SLT}+(A4-A3)*P_{SLT}+F_{SP}$, whereby $P_{SEC}Hi=A4/A3*P_{SLT}+F_{SP}/A3$, and therefore the gain (input/output ratio) of the secondary regulator valve 58 is A4/A3 (A4>A3), or in other words, the gain is greater than 1.

The high secondary pressure $P_{SEC}$Hi is supplied to the lock-up clutch 3 through the oil passage b6 via the lock-up control valve 10 and the lock-up relay valve 59. Further, the high secondary pressure $P_{SEC}$Hi supplied through the oil passage b5 is reduced by the orifice 19 and check valve 12 and then supplied to the torque converter 2. As a result, the lock-up clutch 3 is engaged by the differential pressure between the pressure supplied to the lock-up clutch 3 and the pressure supplied to the torque converter 2.

By increasing the gain of the secondary regulator valve 58 beyond or above 1 in this manner, the secondary pressure $P_{SEC}$ can be raised or increased beyond the input control pressure $P_{SLT}$, and the required transfer torque capacity can be secured in the lock-up clutch 3 without raising the control pressure $P_{SLT}$ of the linear solenoid valve SLT unnecessarily, or in other words without raising or increasing the line pressure $P_L$ unnecessarily, enabling an improvement in fuel economy.

However, when control pressure is input into the two oil chambers 58a, 58b of the secondary regulator valve 58 in the manner described above, the land portion 58p/4 positioned in the intermediate part of the spool 58p must be formed with a greater diameter than the plunger 58j (i.e. D4>D3) in order to cause the control pressure $P_{SLT}$ input into the third oil chamber 58c in particular to act so that the gain increases beyond or above 1.

Further, if the land portion 58p/1 of the spool 58p is formed with an identical diameter to the land portion 58p/4, the gain of the low secondary pressure $P_{SEC}$Lo in particular decreases (such that $P_{SEC}Lo=A3/A4*P_{SLT}+F_{SP}/A4$), and hence when the throttle opening increases, the torque transfer capacity of the torque converter 2 may be insufficient in relation to the increase in engine output.

Typically, the various valves of the hydraulic control apparatus are structured by forming a valve hole in a plate-form valve body, inserting a spool, and sealing in the spool with a lid-form member. However, when the land portion 58p/4 positioned in the intermediate part of the spool 58p has a large diameter as described above, a gap is formed between the part positioned on the rear end side (in the insertion direction) of the inserted spool 58p and the valve hole 22, and hence a member such as the aforementioned sleeve 58i must be provided. Further, when the sleeve 58i is provided between the valve hole 22 and spool 58p, for example, the axial center of the valve hole 22 and the axial center of the sleeve 58p are not always concentric, and if the spool 58p is simply provided in an extending manner, the resulting eccentricity may lead to problems such as an increase in contact resistance between the spool 58p and sleeve 58p or the formation of a gap therebetween. To avoid these problems, the plunger 58j must be provided to slide concentrically in relation to the sleeve 58i and the sleeve 58p must be depressed via the plunger 58j.

SUMMARY

Providing a sleeve and a plunger to increase the gain of the secondary regulator valve beyond or above 1 during output of the high secondary pressure leads to increases in cost, the number of components, and the number of manufacturing steps. Moreover, if the diameter of the spool (i.e. the land portion 58p/4) is increased, the secondary regulator valve must be enlarged, making it difficult to manufacture a compact hydraulic control apparatus for an automatic transmission.

The invention provides, among other things, a hydraulic control apparatus for an automatic transmission, which is capable of increasing the gain of a second pressure regulating valve beyond or above 1 and has a simple, compact structure.

The hydraulic control apparatus for an automatic transmission is structured such that the spool of the second pressure regulating valve comprises the large diameter portion and the small diameter portion, and the third oil chamber is formed between the large diameter portion and the small diameter portion. The hydraulic control apparatus for an automatic transmission further comprises a gain increasing pressure input device, which is capable of inputting a pressure to raise or increase the gain of the second pressure regulating valve beyond or above 1 during output of the high secondary pressure of the second pressure regulating valve to the third oil chamber. Thus, the gain of the second pressure regulating valve can be raised beyond or increased more than 1 without the need to provide a sleeve or plunger, and as a result, the second pressure regulating valve can be structured simply, leading to a reduction in the number of components, simplification of the manufacturing process, and an increase in compactness.

The hydraulic control apparatus for an automatic transmission comprises a first solenoid valve, which is capable of outputting the first signal pressure, and the first switching valve for switching between a state in which the secondary pressure is output to the lock-up clutch and a state in which the secondary pressure is blocked, on the basis of the first signal pressure of the first solenoid valve. Thus, controlling the first solenoid valve can control the engagement and disengagement of the lock-up clutch.

The hydraulic control apparatus for an automatic transmission may be structured such that the first solenoid valve inputs the line pressure as the source pressure of the first signal pressure, and outputs the line pressure unmodified as the first signal pressure during output of the first signal pressure, and such that the gain increasing pressure input device comprises the first oil passage which inputs the first signal pressure of the first solenoid valve into the third oil chamber. Thus, the line pressure can be supplied as the pressure for raising or increasing the gain of the second pressure regulating valve beyond or above 1. Moreover, because the gain of the second pressure regulating valve is increased more than 1 by the first signal pressure of the first solenoid valve, control of the line pressure can be performed to raise or increase the gain of the second pressure regulating valve beyond or above 1 in response to the engagement of the lock-up clutch.

The hydraulic control apparatus for an automatic transmission may be structured such that the gain increasing pressure input device comprises the second solenoid valve which is capable of outputting the second signal pressure, the second oil passage for leading the line pressure to the third oil chamber, and the second switching valve interposed on the second oil passage, for switching the second oil passage between a communicative state and a blocked state on the basis of the second signal pressure. Thus, the line pressure can be supplied as the pressure for raising or increasing the gain of the second pressure regulating valve beyond or above 1. Moreover, because the gain of the second pressure regulating valve is increased more than 1 by the second signal pressure of the second solenoid valve, control of the line pressure can be performed to raise or increase the gain of the second pressure regulating valve beyond or above 1 regardless of the engagement operation of the lock-up clutch.

BRIEF DESCRIPTION OF THE DRAWINGS

Embodiments of the invention will be described below with reference to the drawings, in which.

DETAILED DESCRIPTION OF EMBODIMENTS

Figure 1:
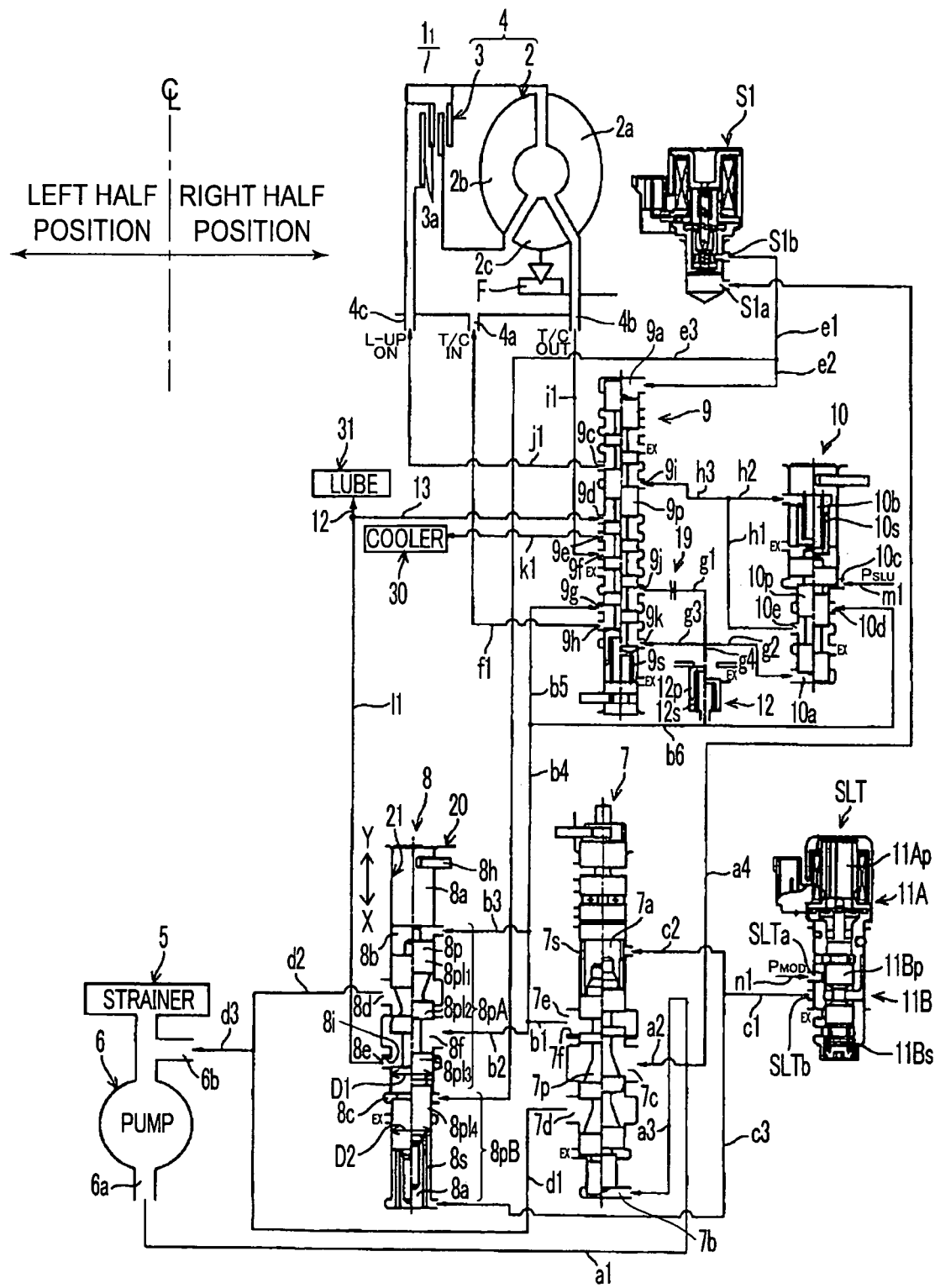
FIG. 1 is a view showing a hydraulic control apparatus for an automatic transmission according to a first embodiment of the invention.

A first embodiment of the invention will be described below with reference to the drawings. FIG. 1 is a view showing a hydraulic control apparatus for an automatic transmission according to the first embodiment.

For example, an automatic transmission (a complete drawing of which is not provided) installed in a vehicle or the like, comprises an input shaft that can be connected to a crankshaft of an engine, a hydraulic transmission apparatus 4, which is capable of hydraulically transmitting the rotation (driving power) of the input shaft, and a speed change mechanism which changes the speed of the rotation input therein via the hydraulic transmission apparatus 4 using a gear mechanism and a friction engagement element (clutch and brake), and outputs the speed change to an output shaft. The automatic transmission further comprises a hydraulic control apparatus 1 for an automatic transmission, which hydraulically controls the hydraulic transmission apparatus and the engagement state of the friction engagement element in the speed change mechanism.

As shown in FIG. 1, the hydraulic transmission apparatus 4 comprises a torque converter 2 having a pump impeller 2a for inputting the rotation of the input shaft, a turbine runner 2b which is rotated (subjected to hydraulic transmission) upon reception of a flow of oil from the pump impeller 2a, and a stator 2c which generates a torque increasing effect while rectifying the oil that is returned to the pump impeller 2a from the turbine runner 2b. The hydraulic transmission apparatus 4 also comprises a lock-up clutch 3, to be described in detail below, which directly couples the input shaft and turbine runner 2b on the basis of an oil pressure supply. Note that when the rotation of the turbine runner 2b decreases below the rotation of the pump impeller 2a, the stator 2c is held stationary by a one-way clutch F and generates the torque increasing effect upon reception of a reaction force of the oil flow. When the rotation of the turbine runner 2b increases beyond the rotation of the pump impeller 2a, the stator 2c spins idly, thereby preventing the oil flow from acting in a negative direction.

Next, a hydraulic control apparatus $1_1$ for an automatic transmission according to the invention will be described. As shown in FIG. 1, the hydraulic control apparatus $1_1$ for an automatic transmission comprises a strainer 5, an oil pump 6, a linear solenoid valve (control valve) SLT, a primary regulator valve (first pressure regulating valve) 7, a secondary regulator valve (second pressure regulating valve) 8, a solenoid valve (first solenoid valve) S1, a lock-up relay valve (first switching valve) 9, a lock-up control valve 10, a check valve 12, an orifice 19, an oil cooler 30, a lubricating oil passage (LUBE) 31, and so on.

Note that in addition to the parts shown in FIG. 1, the hydraulic control apparatus $1_1$ for an automatic transmission comprises various valves, oil passages, and so on for supplying oil pressure to a hydraulic servo for the clutch and brake of the speed change mechanism. However, for ease of description, components other than the main parts of the disclosure will not be described.

As shown in FIG. 1, the hydraulic control apparatus $1_1$ for an automatic transmission comprises the oil pump 6, which is driven in response to rotation of the engine, and generates oil pressure by having the oil pump 6 aspirate oil from an oil pan, not shown in the drawing, via the strainer 5. The oil pressure generated by the oil pump 6 is output to oil passages a1, a2, a3, a4 through an output port 6a and regulated by the primary regulator valve 7, as will be described in detail below.

The linear solenoid valve SLT comprises a linear drive portion 11A and a pressure regulating valve portion 11B. The linear drive portion 11A is provided with a plunger 11Ap whose position is electronically controlled (linearly driven) in accordance with a throttle opening on the basis of a signal from an electronic control apparatus, not shown in the drawing, and the pressure regulating valve portion 11B is provided with a spool 11Bp, a spring 11Bs, which urges the spool 11Bp to or toward the plunger 11Ap side, an input port SLTa into which a modulator pressure $P_{MOD}$ is input, and an output port SLTb.

For example, when a driving seat accelerator pedal, not shown in the drawing, is depressed such that the throttle opening increases, the plunger 11Ap is driven to move downward, in a direction as indicated by arrow X in the drawings ("X direction" hereafter), in accordance with the throttle opening by means of electronic control. When the spool 11Bp is controlled to move in the X direction against the urging force of the spring 11Bs as a result of the driving pressure on the plunger 11Ap, the degree of communication between the input port SLTa and output port SLTb increases in accordance with the movement of the spool 11Bp, and as a result, a control pressure $P_{SLT}$ is output through the output port SLTb in proportion to the magnitude of the throttle opening.

The primary regulator valve 7 comprises a spool 7p, a spring 7s, which urges the spool 7p downward, an oil chamber 7a provided above the spool 7p, an oil chamber 7b provided below the spool 7p, a pressure regulating port 7c, a discharge port 7d, and an output port 7e. The control pressure $P_{SLT}$ is input into the oil chamber 7a from the linear solenoid valve SLT via oil passages c1, c2, and a line pressure $P_L$ to be described in detail below is input into the oil chamber 7b via the oil passages a2, a3 as a feedback pressure.

The urging force of the spring 7s and the control pressure $P_{SLT}$ act on the spool 7p of the primary regulator valve 7 in opposition to the feedback pressure. In other words, the position of the spool 7p is controlled principally by the magnitude of the control pressure $P_{SLT}$. When the spool 7p is moved in the right half position as shown in the drawings, the pressure regulating port 7c and discharge port 7d communicate, and when the spool 7p is controlled to move to a left half position as shown in the drawings, the communication amount (throttle amount) between the pressure regulating port 7c and discharge port 7d is steadily throttled (blocked). In other words, the spool 7p is controlled to move downward according to the magnitude of the control pressure $P_{SLT}$ input into the oil chamber 7a, and the oil pressure of the pressure regulating port 7c is regulated by regulating the amount of oil pressure discharged through the discharge port 7d. As a result, the oil pressure in the oil passages a1, a2, a3, a4 is regulated as the line pressure $P_L$ corresponding to the throttle opening.

The oil pressure discharged through the discharge port 7d is returned to a port 6b of the oil pump 6 to serve as a source pressure of the oil pump 6, and thereby reduces or decreases the driving force required by the oil pump 6. Thus, wasteful energy consumption can be avoided, which contributes to an improvement in the fuel economy of the vehicle in which, for example, the hydraulic control apparatus $1_1$ for an automatic transmission is installed.

Note that the line pressure $P_L$ is also supplied to a modulator valve via an oil passage, not shown in the drawing, and when the line pressure $P_L$ is equal to or lower than a predetermined pressure, the modulator valve outputs the oil pressure unmodified as the modulator pressure $P_{MOD}$. When the line pressure $P_L$ exceeds the predetermined pressure, the modulator valve outputs the oil pressure regulated to a fixed pressure as the modulator pressure $P_{MOD}$.

The secondary regulator valve 8 is structured such that a spring 8s and a spool 8p are inserted into a hole portion 21 drilled into a valve body 20, a lid member 8g is fitted thereon, and the lid member 8g is fixed by a key member 8h. Thus, the spool 8p is urged upward by the spring 8s. That is, the spool 8p is urged upward by the spring 8s in a direction as indicated by arrow Y in the drawings ("Y direction" hereafter). The secondary regulator valve 8 further comprises an oil chamber 8a provided below the spool 8p, an oil chamber 8b provided above the spool 8p, an oil chamber 8c to be described in detail below, a pressure regulating port (pressure regulating portion) 8f, a discharge port (pressure regulating portion) 8d, and an output port (pressure regulating portion) 8e.

The spool 8p is formed, for example, as a shaft that moves in relation to the X-Y arrows (FIG. 1). For example, the spool 8p moves in a linear direction along the X direction and the Y direction as shown in the drawings. The spool 8p comprises a large diameter portion 8pA formed with three land portions $8pl_1$, $8pl_2$, $8pl_3$ having an outer diameter D1, and a small diameter portion 8pB formed with a land portion $8pl_4$ having an outer diameter D2 which is smaller than the outer diameter D1. The oil chamber 8c is formed between the large diameter portion 8pA and small diameter portion 8pB. Accordingly, the oil chamber 8b has a pressure receiving area $(D1^2\pi)/4$ ("pressure receiving area A1" hereafter) based on the outer diameter D1, the oil chamber 8a has a pressure receiving area $(D2^2\pi)/4$ ("pressure receiving area A2" hereafter) based on the outer diameter D2, and the oil chamber 8c has a pressure receiving area $(D1^2-D2^2)\pi/4$ ("pressure receiving area A1−A2" hereafter) based on the difference in diameter between the outer diameter D1 and the outer diameter D2. The control pressure $P_{SLT}$ is input into the oil chamber 8a from the linear solenoid valve SLT via the oil passages c1, c3, a secondary pressure $P_{SEC}$ to be described in detail below is input into the oil chamber 8b as a feedback pressure, and the line pressure $P_L$ is input into the oil chamber 8c from the solenoid valve S1 to be described below when the lock-up clutch 3 is engaged.

When the spool 8p of the secondary regulator valve 8 is positioned on the lower side of the drawing, the pressure regulating port 8f and discharge port 8d communicate, and when the spool 8p is controlled to move in the Y direction (FIG. 1), the communication amount (throttle amount) between the pressure regulating port 8f and discharge port 8d is steadily throttled (blocked). In other words, the spool 8p is controlled to move according to the magnitude of the control pressure $P_{SLT}$ input into the oil chamber 8a, and the oil pressure of the pressure regulating port 8f is regulated by regulating the amount of oil pressure discharged through the discharge port 8d. As a result, the oil pressure in the oil passages b1, b2, b3, b4, b5, b6 is regulated as the secondary pressure $P_{SEC}$ corresponding to the throttle opening.

Similarly to the oil pressure discharged from the primary regulator valve 7, the oil pressure discharged from the discharge port 8d is returned to the port 6b of the oil pump 6 to serve as the source pressure of the oil pump 6, and thereby reduces or decreases the driving force required by the oil pump 6. Thus, wasteful energy consumption can be avoided, which contributes to an improvement in the fuel economy of the vehicle in which, for example, the hydraulic control apparatus $1_1$ for an automatic transmission is installed.

The solenoid valve S1 (a normally closed valve, for example) comprises an input port S1a and an output port S1b. The line pressure $P_L$ regulated by the primary regulator valve 7 is input into the input port S1a via the oil passage a4. When the solenoid valve S1 is in an OFF state (a non-conductive state), the input port S1a and output port S1b are blocked from each other. When the solenoid valve S1 is switched to an ON state (conductive state) by a signal from an electronic control apparatus, not shown in the drawing, the input port S1a and output port S1b communicate with each other such that the line pressure $P_L$ input into the input port S1a is output substantially unmodified through the output port S1b as a signal pressure (first signal pressure) $P_{S1}$. The signal pressure $P_{S1}$ (line pressure $P_L$) output through the output port S1b is input into an oil chamber 9a of the lock-up relay valve 9, to be described below, via oil passages e1, e2, and also supplied to the oil chamber 8c of the secondary regulator valve 8 via oil passages (gain increasing pressure input device, first oil passage) e1, e3.

Note that when the solenoid valve S1 is non-conductive, the input port S1a and output port S1b are blocked from each other. In other words, the solenoid valve S1 is a so-called normally closed valve. However, the solenoid valve S1 may also be a so-called normally open valve in which the input port S1a and output port S1b communicate with each other during non-conductive periods. In this case, the solenoid valve S1 is energized to prevent output of the signal pressure $P_{S1}$.

The lock-up relay valve 9 comprises a spool 9p, a spring 9s, which urges the spool 9p upward (Y direction in FIG. 1), an oil chamber 9a, which is provided above the spool 9p, a port 9c, a port 9d, a port 9e, a port 9f, a port 9g, a port 9h, a port 9i, a port 9j, and a port 9k.

The output port S1a of the solenoid valve S1 is connected to the oil chamber 9a via the oil passages e1, e2, and when the signal pressure $P_{S1}$ (line pressure $P_L$) is output by the solenoid valve S1, the signal pressure $P_{S1}$ is input therein. In other words, when the signal pressure $P_{S1}$ has not been output by the solenoid valve S1, the lock-up relay valve 9 is in a position as indicated by the left half position of the lock-up relay valve 9, as shown in FIG. 1 ("left half position" hereafter), and when the signal pressure $P_{S1}$ has been output by the solenoid valve S1, the lock-up relay valve 9 is in a position as indicated by the right half position of the lock-up relay valve 9, as shown in FIG. 1 ("right half position" hereafter).

When the spool 9p of the lock-up relay valve 9 is in the left half position, communication is established between the port 9g and the port 9h, between the port 9f and the port 9e, and between the port 9j and a drain port EX. When the spool 9p is in the right half position, communication is established between the port 9i and the port 9c, between the port 9d and the port 9e, between the port 9f and the drain port EX, between the port 9g and the port 9j, and between the port 9k and the port 9h.

When the solenoid valve S1 is in an OFF state, no oil pressure is input into the oil chamber 9 and the spool 9p is held in the left half position by the urging force of the spring 9s. Thus, the secondary pressure $P_{SEC}$ input into the port 9g via the oil passage b5 is output from the port 9h and supplied to an input port 4a of the hydraulic transmission apparatus 4 via an oil passage f1. In other words, the secondary pressure $P_{SEC}$ is supplied to the interior of the torque converter 2. The oil supplied to the interior of the torque converter 2 is discharged through a discharge port 4b, input into the port 9f of the lock-up relay valve 9 via an oil passage i1, output through the port 9e, and input into the oil cooler (COOLER) 30. Note that the oil input into the oil cooler 30 is cooled by the oil cooler 30, discharged to the oil pan not shown in the drawing, and then aspirated by the oil pump 6 again via the strainer 5.

When the solenoid valve S1 is in an ON state, the signal pressure $P_{S1}$ is input into the oil chamber 9a and the spool 9p moves to the right half position against the urging force of the spring 9s. As a result, the secondary pressure $P_{SEC}$ input into the port 9g via the oil passage b5 is output from the port 9j and supplied to the orifice 19 and oil passages g1, g2, g3, g4.

The oil passage g4 is connected to the check valve 12 having a plunger 12p and a spring 12s which urges the plunger 12p upward. When the secondary pressure $P_{SEC}$ rises or increases above a predetermined pressure, the plunger 12p is pushed downward against the urging force of the spring 12s, thereby opening a drain port EX of the check valve 12 through which the secondary pressure $P_{SEC}$ is drained (discharged). As a result, the secondary pressure $P_{SEC}$ in the oil passages g1, g2, g3, g4 is reduced or decreased to the predetermined pressure. In other words, the reduced secondary pressure $P_{SEC}$ is input into the port 9k and also input into an oil chamber 10a of the lock-up control valve 10 to be described below.

The reduced secondary pressure $P_{SEC}$ input into the port 9k is supplied to the interior of the torque converter 2 through the port 9h via the oil passage f1, as described above. Note that the oil which is discharged from the discharge port 4b and input into the port 9f of the lock-up relay valve 9 via the oil passage i1 is drained through the drain port EX of the lock-up relay valve 9 as is.

Meanwhile, the lock-up control valve 10 comprises a spool 10p, a spring 10s which urges the spool 10p downward (via a plunger), the oil chamber 10a provided below the spool 10p, an oil chamber 10b provided above the spool 10p, an oil chamber 10c formed by a difference in the diameter (a difference in the pressure receiving area) of land portions of the spool 10p, a port 10d, and a port 10e.

When the lock-up relay valve 9 is in the right half position, the secondary pressure $P_{SEC}$ reduced to the predetermined pressure by the check valve 12 is input into the oil chamber 10a, and a control pressure $P_{SLU}$ is input into the oil chamber 10c on the basis of electronic control performed by a linear solenoid valve SLU not shown in the drawing. Further, a lock-up engagement pressure, to be described below, which is output from the port 10e is input into the oil chamber 10b via oil passages h1, h2 as a feedback pressure.

As the control pressure $P_{SLU}$ is gradually input into the oil chamber 10c following input of the reduced secondary pressure $P_{SEC}$ into the oil chamber 10a, the spool 10p of the lock-up control valve 10 is controlled to move upward (e.g., from the right half position to the left half position as indicated in the drawings) against the urging force of the spring 10s and the feedback pressure. As the spool 10p moves upward in the Y direction, the port 10d and port 10e steadily establish a state of communication (the throttle amount therebetween steadily decreases) such that the secondary pressure $P_{SEC}$ input into the port 10d via the oil passage b6 is regulated to increase steadily and output to the oil passages h1, h2, h3 through the port 10e. When the control pressure $P_{SLU}$ rises or increases to or above a predetermined pressure, the port 10d and port 10e of the lock-up control valve 10 enter a state of substantially complete communication, and the secondary pressure $P_{SEC}$ is output to the oil passages h1, h2, h3 as is.

The secondary pressure $P_{SEC}$ output to the oil passage h3 is input into the port 9i of the lock-up relay valve 9, the spool 9p of which is in the right half position, and then input into a port 4c of the hydraulic transmission apparatus 4 through the port 9c via an oil passage j1. When the oil pressure input into the port 4c increases more than or beyond the reduced secondary pressure $P_{SEC}$ supplied to the interior of the torque converter 2 (i.e. the oil pressure of the input port 4a), frictionplates 3a of the lock-up clutch 3 are pushed toward each other or engage with each other such that the lock-up clutch 3 engages. That is, the friction plates 3a move in a direction, for example, to the right side of the drawing, as a result of which the lock-up clutch 3 is engaged.

Then, when the solenoid valve S1 is switched OFF such that the spool 9p of the lock-up relay valve 9 is urged to the left half position by the spring 9s, the port 9c communicates with the drain port EX such that the oil pressure of the lock-up clutch 3 is drained via the oil passage j1 and the port 4c. Further, when the secondary pressure $P_{SEC}$ input into the oil chamber 10a via the oil passage g2 is blocked by the lock-up relay valve 9 and the oil passage g2 communicates with the drain port EX via the port 9j such that the secondary pressure $P_{SEC}$ is drained through the drain port EX, the spool 10p of the lock-up control valve 10 moves to the right half position, thereby causing the port 10e to communicate with the drain port EX, and as a result, the oil pressure in the oil passages h1, h2, h3 is also drained.

Next, an operation to switch the secondary pressure $P_{SEC}$ between high pressure and low pressure, will be described. In the hydraulic control apparatus $1_1$ for an automatic transmission according to the first embodiment of the invention, the oil passages e1, e3 are provided for connecting the output port S1b of the solenoid valve S1 to the oil passage 8c of the secondary regulator valve 8, as described above. When the solenoid valve S1 outputs the signal pressure $P_{S1}$ (line pressure $P_L$), the lock-up relay valve 9 moves from the left half position to the right half position such that the secondary pressure $P_{SEC}$ is supplied to the lock-up clutch 3. When the solenoid valve S1 does not output the signal pressure $P_{S1}$, supply of the secondary pressure $P_{SEC}$ to the lock-up clutch 3 is blocked. In other words, when the lock-up clutch 3 is engaged, the line pressure $P_L$ is input into the oil chamber 8c of the secondary regulator valve 8, and when the lock-up clutch 3 is disengaged, no oil pressure is input.

When the signal pressure $P_{S1}$ (line pressure $P_L$) is not output by the solenoid valve S1, the control pressure $P_{SLT}$ from the linear solenoid valve SLT is input into the oil chamber 8a of the secondary regulator valve 8 and the feedback pressure of the secondary pressure $P_{SEC}$ is input into the oil chamber 8b. In this state, the spool 8p is controlled to a comparatively downward positional range such that the throttle amount between the discharge port 8d and pressure regulating port 8f is small (the communication therebetween is large). Hence, the secondary pressure $P_{SEC}$, which is regulated in the pressure regulating port 8f of the secondary regulator valve 8, is set to a low secondary pressure ("low secondary pressure" hereafter) $P_{SEC}$Lo.

Figure 2:
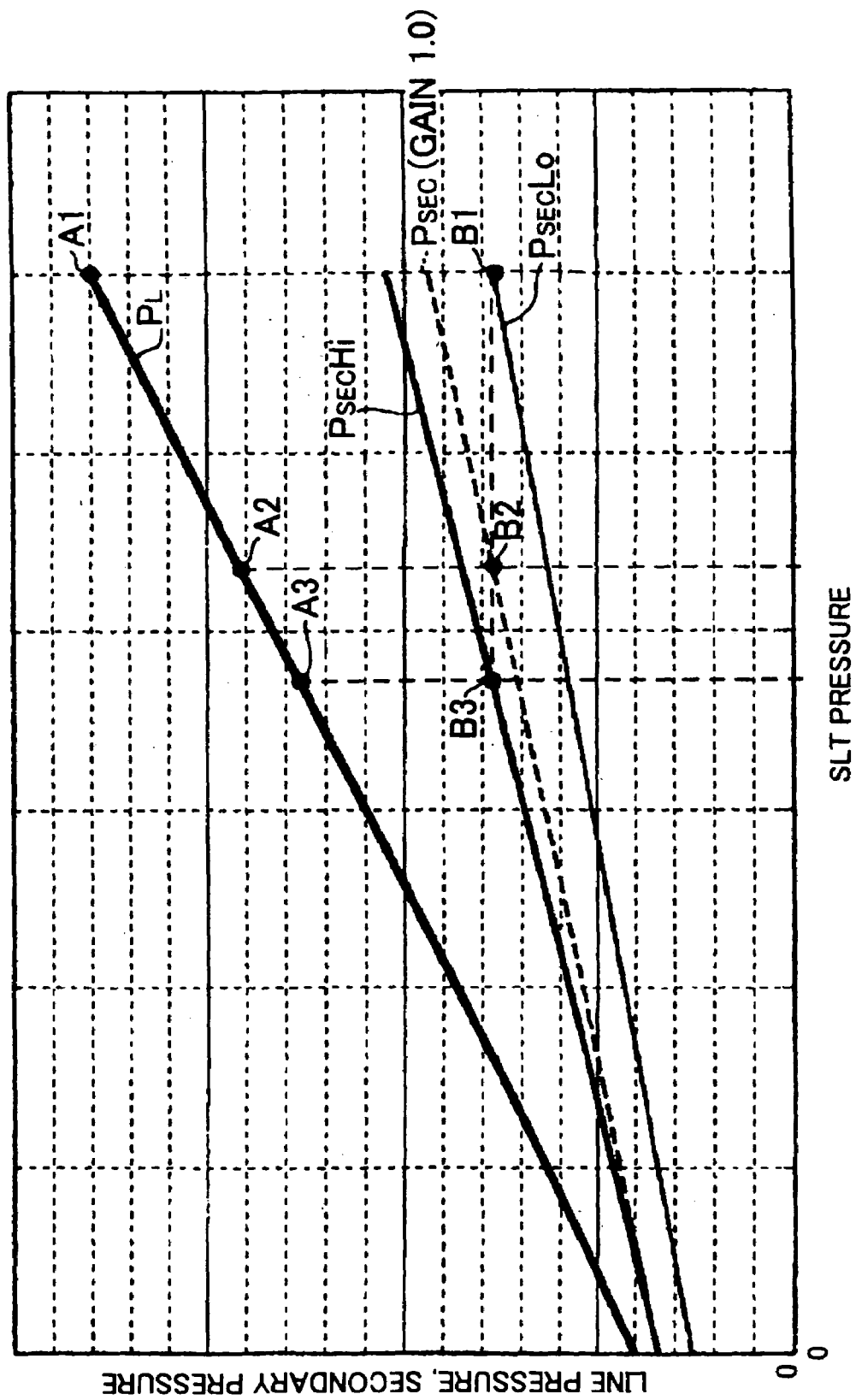
FIG. 2 is a view showing the relationship of an SLT pressure with a line pressure and a secondary pressure in the hydraulic control apparatus for an automatic transmission of the invention.

Here, assuming that the urging force of the spring 8s is $F_{SP}$, the low secondary pressure $P_{SEC}$Lo may be expressed by the formula $A1 \times P_{SEC}Lo = A2 \times P_{SLT} + F_{SP}$, whereby $P_{SEC}Lo = A2/A1 \times P_{SLT} + F_{SP}/A1$, and therefore the gain (input/output ratio) of the secondary regulator valve 8 is A2/A1 (A1>A2), or in other words, the gain is less than 1 (see FIG. 2).

On the other hand, when the signal pressure $P_{S1}$ (line pressure $P_L$) is output by the solenoid valve S1 such that the control pressure $P_{SLT}$ from the linear solenoid valve SLT is input into the oil chamber 8a of the secondary regulator valve 8 and the feedback pressure of the secondary pressure $P_{SEC}$ is input into the oil chamber 8b, the line pressure $P_L$ is input into the oil chamber 8c. In this state, the spool 8p is controlled to a comparatively upward positional range such that the throttle amount between the discharge port 8d and pressure regulating port 8f is large (the communication therebetween is small). Hence, the secondary pressure $P_{SEC}$, which is regulated in the pressure regulating port 8f of the secondary regulator valve 8, is set to a high secondary pressure ("high secondary pressure" hereafter) $P_{SEC}$Hi.

Likewise assuming that the urging force of the spring 8s is $F_{SP}$, the high secondary pressure $P_{SEC}$Hi may be expressed by the formula $A1 \times P_{SEC}Hi = A2 \times P_{SLT} + (A1-A2) \times P_L + F_{SP}$, whereby $P_{SEC}Hi A2/A1 \times P_{SLT} + (A1-A2)/A1 \times P_L + F_{SP}/A1$. Assuming that $P_L = \alpha \times P_{SLT}$ (where α is a coefficient), $P_{SEC}Hi = \{A2 + \alpha(A1-A2)\}/A1 \times P_{SLT} + F_{SP}/A1$, and therefore the gain (input/output ratio) of the secondary regulator valve 8 is A2+α(A1−A2) }/A1 (A1>A2, α>1), or in other words, the gain is greater than 1 (see FIG. 2).

In a case where the low secondary pressure $P_{SEC}$Lo is supplied to the lock-up clutch 3 as is, for example, an oil pressure B1, as shown in FIG. 2, is output to secure the torque capacity required as the transfer torque of the lock-up clutch 3. Therefore, the linear solenoid valve SLT is controlled to raise or increase the control pressure $P_{SLT}$, and the low secondary pressure $P_{SEC}$Lo is raised or increased to the oil pressure B1. At this time, the control pressure $P_{SLT}$ is also input into the oil chamber 7a of the primary regulator valve 7 via the oil passage c2, causing the line pressure $P_L$ to rise or increase to an oil pressure A1.

In a conventional case where the control pressure $P_{SLT}$ is input into the oil chamber 58c of the secondary regulator valve 58 such that the secondary pressure $P_{SEC}$, having set the gain to 1, is supplied to the lock-up clutch 3, for example, an oil pressure B2 as shown in FIG. 2 (the secondary pressure being identical to the oil pressure B1) must be output to secure the torque capacity required as the transfer torque of the lock-up clutch 3, and as a result, the line pressure $P_L$ is raised or increased to an oil pressure A2 on the basis of the control pressure $P_{SLT}$. However, in the hydraulic control apparatus $1_1$ for an automatic transmission according to the invention, the line pressure $P_L$ is input into the oil chamber 8c of the secondary regulator valve 8 as a pressure that raises or increases the gain of the secondary regulator valve 8 beyond or above 1. Therefore, the control pressure $P_{SLT}$ does not have to be raised or increased unnecessarily to output an oil pressure B3 as shown in FIG. 2 (the secondary pressure being identical to the oil pressures B1, B2), and the line pressure $P_L$ is set to an oil pressure A3. In other words, unnecessary increases of the line pressure $P_L$ are avoided.

As shown in FIG. 2, a broken line represents an assumed secondary pressure $P_{SEC}$ having a gain equal to 1 for illustrative purposes. However, the secondary pressure $P_{SEC}$ of the invention may correspond to the low secondary pressure $P_{SEC}$Lo or may correspond to the high secondary pressure $P_{SEC}$Hi. As illustrated in FIGS. 1 and 2, the low secondary pressure $P_{SEC}$Lo is outputted from the secondary regulating valve 8 when the lock-up clutch 3 disengages. Also, the high secondary pressure $P_{SEC}$Hi is outputted from the secondary regulating valve 8 when the lock-up clutch engages. Accordingly, the secondary pressure $P_{SEC}$ can change the pressure by inputted or by not being inputted in the signal pressure $P_{S1}$ to the secondary regulating valve 8.

In the hydraulic control apparatus $1_1$ for an automatic transmission according to the first embodiment of the invention, the spool 8p of the secondary regulator valve 8 is formed with the large diameter portion 8pA and the small diameter portion 8pB; that is, the spool 8p is formed such that the intermediate part thereof does not have a larger diameter than the two end parts. Moreover, the oil chamber 8c is formed between the large diameter portion 8pA and small diameter portion 8pB, and a pressure, which raises or increases the gain of the secondary regulator valve 8 beyond or above 1 can be input into the oil chamber 8c. Thus, the gain of the secondary regulator valve 8 can be raised beyond or increased more than 1 and unnecessary increases of the line pressure $P_L$ can be avoided. In addition, a sleeve and plunger such as those required conventionally do not need to be provided. Hence, the secondary regulator valve 8 can be structured simply, leading to a reduction in the number of components, simplification of the manufacturing process, and an increase in compactness.

The hydraulic control apparatus $1_1$ for an automatic transmission further comprises the solenoid valve S1 which is capable of outputting the signal pressure $P_{S1}$, and the lock-up relay valve 9 which is capable, on the basis of the signal pressure $P_{S1}$ from the solenoid valve S1, of switching between a state in which the secondary pressure $P_{SEC}$ is output to the lock-up clutch 3 and a state in which the secondary pressure $P_{SEC}$ is blocked. Thus, by controlling the solenoid valve S1, engagement and disengagement (engagement or release) of the lock-up clutch 3 can be controlled.

Furthermore, the solenoid valve S1 comprises the oil passage e3 which inputs the line pressure $P_L$ as the source pressure of the signal pressure $P_{S1}$, outputs the line pressure $P_L$ unmodified as the signal pressure $P_{S1}$ during output of the signal pressure $P_{S1}$, and inputs the signal pressure $P_{S1}$ of the solenoid valve S1 into the oil chamber 8c. Hence, the line pressure $P_L$ can be supplied as the pressure which raises or increases the gain of the secondary regulator valve 8 beyond or more than 1. Also, because the gain of the secondary regulator valve 8 is raised beyond or increased more than 1 by the signal pressure $P_{S1}$ of the solenoid valve S1, the gain of the secondary regulator valve 8 can be controlled to increase more than 1 in response to the engagement of the lock-up clutch 3. In other words, unnecessary increases of the line pressure $P_L$ can be avoided while the lock-up clutch 3 is engaged.

Figure 3:
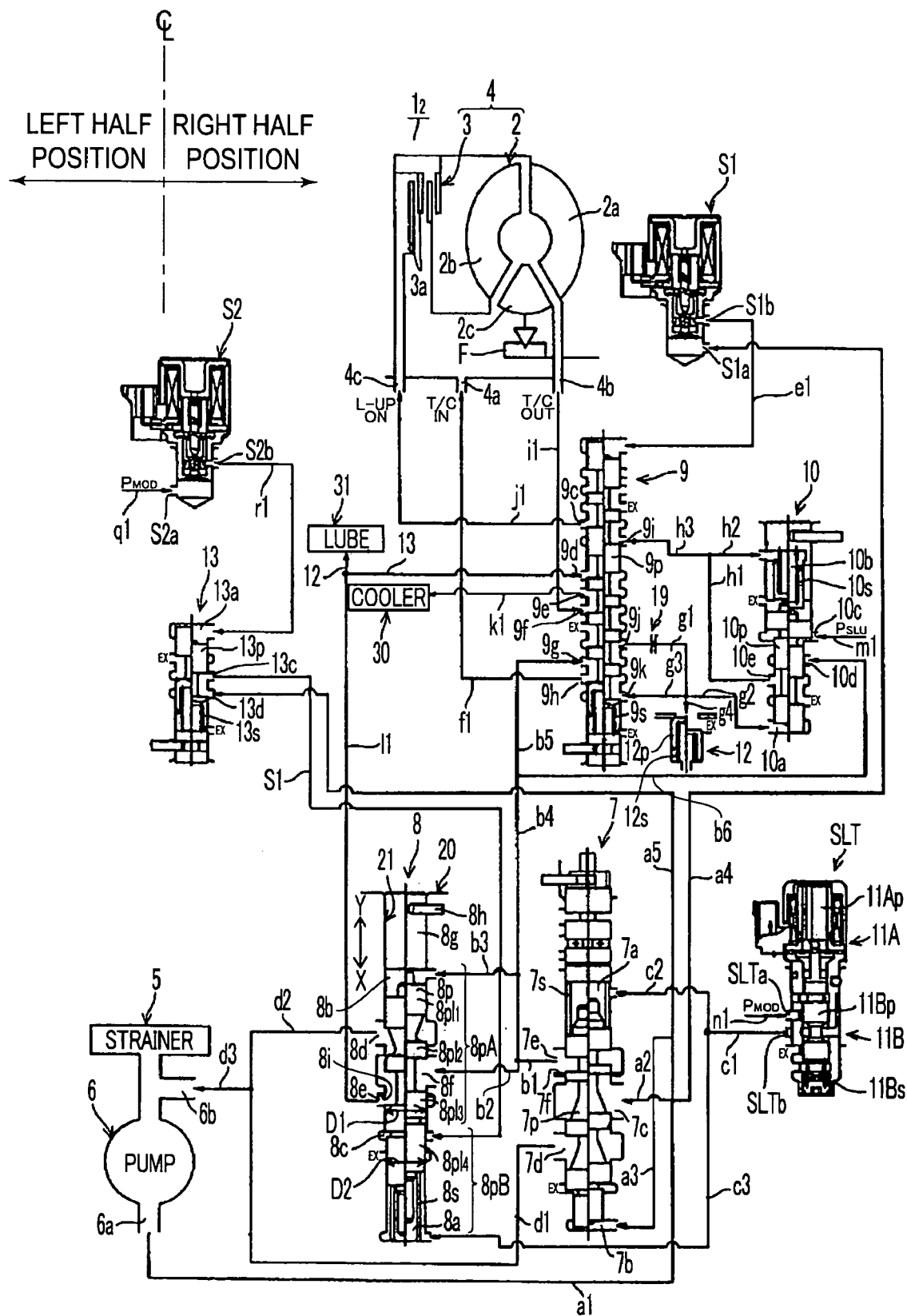
FIG. 3 is a view showing a hydraulic control apparatus for an automatic transmission according to a second embodiment of the invention.
Figure 4:
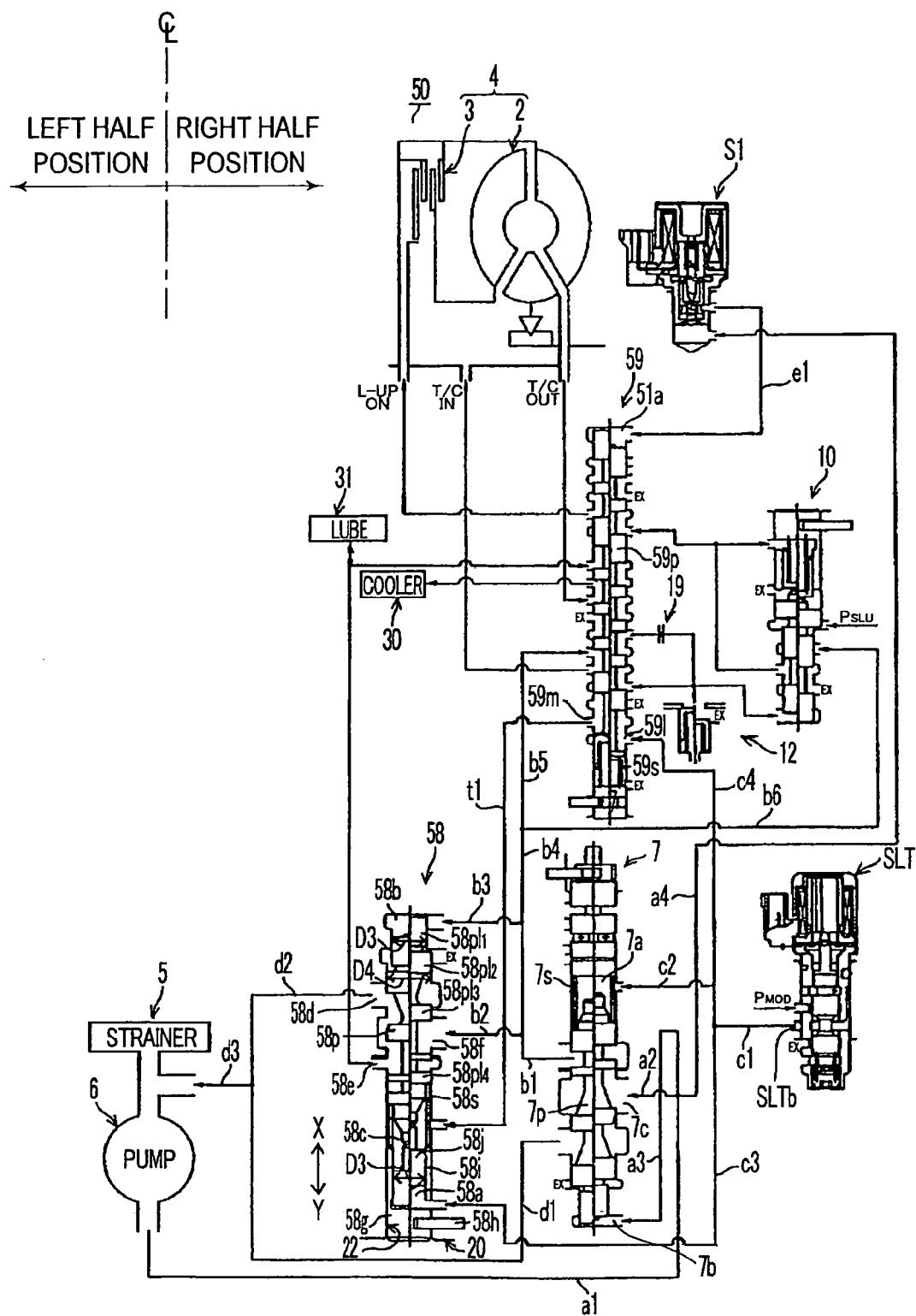
FIG. 4 is a view showing an example of a conventional hydraulic control apparatus for an automatic transmission.

Next, a second embodiment arrived at by partially modifying the first embodiment will be described with reference to FIG. 3. FIG. 3 is a view showing a hydraulic control apparatus for an automatic transmission according to the second embodiment. In the second embodiment, identical reference symbols have been allocated to parts, other than the modified parts, which are identical to those of the first embodiment, and description thereof are substantially omitted.

As shown in FIG. 3, a hydraulic control apparatus $1_2$ for an automatic transmission according to the second embodiment differs from the hydraulic control apparatus $1_1$ for an automatic transmission described above in the omission, for example, of the oil passage e3. The second embodiment includes the provision of oil passages (gain increasing pressure input device, second oil passage) a2, a5, s1, which lead (supply) the line pressure $P_L$ to the oil chamber 8c by connecting the pressure regulating port 7c of the primary regulator valve 7 to the oil chamber 8c of the secondary regulator valve 8, a relay valve (gain increasing pressure input device, second switching valve) 13 interposed between the oil passages a2, a5, s1, and a solenoid valve (second solenoid valve) S2, which is capable of outputting a signal pressure (second signal pressure) $P_{S2}$ for controlling the spool position of the relay valve 13.

More specifically, the solenoid valve S2 (a normally closed valve, for example) comprises an input port S2a and an output port S2b, the aforementioned modulator pressure $P_{MOD}$ being input into the input port S2a via an oil passage q1. When the solenoid valve S2 is in an OFF state (a non-conductive state), the input port S2a and output port S2b are blocked from each other. When the solenoid valve S2 enters an ON state (conductive state) on the basis of a signal from an electronic control apparatus not shown in the drawing, the input port S2a and output port S2b communicate with each other such that the modulator pressure $P_{MOD}$ input into the input port S2a is output through the output port S2b substantially unmodified or unchanged as the signal pressure $P_{S2}$. The signal pressure $P_{S2}$ (modulator pressure $P_{MOD}$) output through the output port S2b is input into an oil chamber 13a of the relay valve 13 via an oil passage r1.

Note that when the solenoid valve S2 is non-conductive, the input port S2a and output port S2b are blocked from each other. In other words, the solenoid valve S2 is a so-called normally closed valve. However, the solenoid valve S2 may be a so-called normally open valve in which the input port S2a and output port S2b communicate with each other during non-conductive periods. In this case, the solenoid valve S2 is energized to prevent output of the signal pressure $P_{S2}$.

The relay valve 13 comprises a spool 13p, a spring 13s for urging the spool 13p upward, the oil chamber 13a provided above the spool 13p, a port 13c, and a port 13d. The output port S2a of the solenoid valve S2 is connected to the oil chamber 13a via the oil passage r1, and when the signal pressure $P_{S2}$ is output by the solenoid valve S2, the signal pressure $P_{S2}$ is input into the oil chamber 13a. In other words, when the signal pressure $P_{S2}$ is not output by the solenoid valve S2, the relay valve 13 moves to the left half position, and when the signal pressure $P_{S2}$ is output by the solenoid valve S2, the relay valve 13 moves to the right half position. When the spool 13p of the relay valve 13 is in the left half position, the port 13c and port 13d are blocked from each other and the port 13c communicates with a drain port EX. When the spool 13p is in the right half position, the port 13c and port 13d communicate with each other.

When the solenoid valve S2 is in an OFF state, no oil pressure is input into the oil chamber 13a and the spool 13p is held in the left half position by the urging force of the spring 13s. As a result, the line pressure $P_L$ input into the port 13d via the oil passages a2, a5 is blocked, and oil pressure is not input into the oil chamber 8c of the secondary regulator valve 8 (instead, the oil pressure is drained via the oil passage s1).

When the solenoid valve S2 enters an ON state, the signal pressure $P_{S2}$ is input into the oil chamber 13a and the spool 13p moves against the urging force of the spring 13s (the right half position as shown in FIG. 3). As a result, the line pressure $P_L$ input into the port 13d via the oil passages a2, a5 is output from the port 13c connected to the oil passage s1. More specifically, the pressure regulating port 7c of the primary regulator valve 7 communicates with the oil chamber 8c of the secondary regulator valve 8 such that the line pressure $P_L$ is input into the oil chamber 8c. When the line pressure $P_L$ is input into the oil chamber 8c of the secondary regulator valve 8, the gain of the secondary regulator valve 8 rises or increases above 1, similarly to the first embodiment, and hence the high secondary pressure $P_{SEC}$Hi can be output, likewise eliminating the need for unnecessary increases in the line pressure $P_L$.

Further, the line pressure $P_L$ is switched between being input and not being input into the oil chamber 8c of the secondary regulator valve 8 according to whether or not the signal pressure $P_{S2}$ is output from the solenoid valve S2. Hence, the gain of the secondary regulator valve 8 can be switched between being greater than 1 and less than 1 regardless of whether or not the signal pressure $P_{S1}$ is output from the solenoid valve S1. In other words, regardless of whether the lock-up clutch 3 is engaged or disengaged by switching the lock-up relay valve 9, the gain of the secondary regulator valve 8 can be switched between being greater than 1 and less than 1. Hence, the transfer torque capacity of the lock-up clutch 3 can be reduced or made smaller, and when there is a need for the line pressure $P_L$ to become higher, increased or the like, the low secondary pressure $P_{SEC}$ Lo can be output, eliminating the need to output the high secondary pressure $P_{SEC}$Hi. Thus, the durability of the torque converter 2 can be improved.

In the hydraulic control apparatus $1_2$ for an automatic transmission according to the second embodiment of the invention, the spool 8p of the secondary regulator valve 8 is formed with the large diameter portion 8pA and the small diameter portion 8pB; that is, the spool 8p is formed such that the intermediate part thereof does not have a larger diameter than the two end parts. Moreover, the oil chamber 8c is formed between the large diameter portion 8pA and small diameter portion 8pB, and a pressure, which raises or increases the gain of the secondary regulator valve 8 beyond or above 1 can be input into the oil chamber 8c. Thus, the gain of the secondary regulator valve 8 can be raised beyond or increased more than 1 and unnecessary increases of the line pressure $P_L$ can be avoided. In addition, a sleeve and plunger such as those required conventionally do not need to be provided, and hence the secondary regulator valve 8 can be structured simply, leading to a reduction in the number of components, simplification of the manufacturing process, and an increase in compactness.

The solenoid valve S2, which is capable of outputting the signal pressure $P_{S2}$, the oil passages a5, s1 that lead (supply) the line pressure $P_L$ to the oil chamber 8c, and the relay valve 13, which is interposed between the oil passages a5, s1 and switches the oil passages a5, s1 between a state of communication and a state of blockage on the basis of the signal pressure $P_{S2}$ are also provided. Hence, the line pressure $P_L$ can be supplied as the pressure to raise or increase the gain of the secondary regulator valve 8 above or more than 1. Furthermore, since the gain of the secondary regulator valve 8 is raised or increased above 1 by the signal pressure $P_{S2}$ of the solenoid valve S2, control can be performed to raise or increase the gain of the secondary regulator valve 8 above 1 regardless of the engagement operation of the lock-up clutch 3. As a result, unnecessary increases in the secondary pressure $P_{SEC}$ can be avoided, and the durability of the torque converter 2 can be improved.

Note that in the first and second exemplary embodiments described above, the line pressure $P_L$ can be input into the oil chamber 8c of the secondary regulator valve 8, but the present invention is not limited thereto, and the gain of the secondary regulator valve 8 may be raised or increased beyond or more than 1 using any device into which a greater pressure than the control pressure $P_{SLT}$ can be input.

Further, in the first and second exemplary embodiments, the modulator pressure $P_{MOD}$ is used as the source pressure of the linear solenoid valve SLT and solenoid valve S2, but any source pressure may be used as long as an oil pressure capable of functioning as the control pressure $P_{SLT}$ and signal pressure $P_{S2}$ can be output.

Further, in the first and second exemplary embodiments, the hydraulic transmission apparatus 4 comprises three ports 4a, 4b, 4c, but the invention may be applied to a hydraulic transmission apparatus having only two ports, in which a secondary pressure is supplied to the torque converter during disengagement of the lock-up clutch from a direction which does not depress the friction plate, and during engagement of the lock-up clutch, the secondary pressure is supplied from a direction which depresses the friction plate.

What is claimed is:

1. A hydraulic control apparatus for an automatic transmission, comprising:
    a control valve for outputting a control pressure in accordance with a throttle opening;
    a first pressure regulating valve to regulate a line pressure in accordance with the control pressure;
    a second pressure regulating valve to regulate a secondary pressure, which is lower than the line pressure, in accordance with the control pressure, the secondary pressure being supplied to a hydraulic transmission apparatus having a lock-up clutch and a torque converter, the second pressure regulating valve comprising:
        a spool formed having a large diameter portion formed with a large diameter land portion on a first axial side thereof, and a small diameter portion formed with a land portion having a smaller diameter than the large diameter land portion on a second axial side thereof;
        a pressure regulating portion to regulate the secondary pressure such that the secondary pressure increases as the spool moves to the first axial side;
        a first oil chamber operated by the control pressure on an end portion of the second axial side of the spool;
        a second oil chamber operated by a feedback pressure of the secondary pressure on an end portion of the first axial side of the spool; and
        a third oil chamber formed between the large diameter portion and the small diameter portion, and
    a gain increasing pressure input device which is capable of inputting a pressure to increase a gain of the second pressure regulating valve in relation to the control pressure beyond 1 into the third oil chamber.

2. The hydraulic control apparatus for an automatic transmission according to claim 1, further comprising:
    a first solenoid valve which is capable of outputting a first signal pressure; and
    a first switching valve for switching between a state in which the secondary pressure is output to the lock-up clutch and a state in which the secondary pressure is blocked, on the basis of the first signal pressure of the first solenoid valve.

3. The hydraulic control apparatus for an automatic transmission according to claim 2, wherein the first solenoid valve is inputted the line pressure as a source pressure of the first signal pressure, and outputs the line pressure unmodified as the first signal pressure during output of the first signal pressure, and
    the gain increasing pressure input device comprises a first oil passage which inputs the first signal pressure of the first solenoid valve into the third oil chamber.

4. The hydraulic control apparatus for an automatic transmission according to claim 2, wherein the gain increasing pressure input device comprises:
    a second solenoid valve which is capable of outputting a second signal pressure;
    a second oil passage for leading the line pressure to the third oil chamber; and
    a second switching valve interposed on the second oil passage, for switching the second oil passage between a communicative state and a blocked state on the basis of the second signal pressure.

5. The hydraulic control apparatus for an automatic transmission according to claim 1, wherein the spool is formed as a shaft.

6. A hydraulic control apparatus for an automatic transmission, comprising:
    a control valve for outputting a control pressure in accordance with a throttle opening;
    a first pressure regulating valve to regulate a line pressure in accordance with the control pressure;
    a second pressure regulating valve to regulate a secondary pressure in accordance with the control pressure, the secondary pressure being supplied to a hydraulic transmission apparatus having a lock-up clutch and a torque converter; and a gain increasing pressure input device which is capable of inputting the line pressure to increase a gain of the second pressure regulating valve in relation to the control pressure into an oil chamber of the second pressure regulating valve.

7. The hydraulic control apparatus for an automatic transmission according to claim 6, wherein the second pressure regulating valve comprises:

a spool having a large diameter portion, a small diameter portion, and an intermediate portion between the large and small diameter portions;

a pressure regulating portion to regulate the secondary pressure such that the secondary pressure increases as the spool moves;

a first oil chamber operated by the control pressure on an end portion of the of the spool;

a second oil chamber operated by a feedback pressure of the secondary pressure on other end portion of the spool; and a third oil chamber formed between the large diameter portion and the small diameter portion.

8. The hydraulic control apparatus for an automatic transmission according to claim 6, wherein the gain is raised above 1.

9. The hydraulic control apparatus for an automatic transmission according to claim 6, wherein the gain is increased more than 1.

10. The hydraulic control apparatus for an automatic transmission according to claim 6, wherein the gain (input/output ratio) of the secondary regulator valve is A2/A1 (A1>A2), A1 is an area of a larger diameter portion, and A2 is an area of a smaller diameter portion.

11. The hydraulic control apparatus for an automatic transmission according to claim 6, wherein the gain (input/output ratio) of the secondary regulator valve is A2+α(A1−A2)}/A1 (A1>A2, α>1), A1 is an area of a larger diameter portion, and A2 is an area of a smaller diameter portion.

12. The hydraulic control apparatus for an automatic transmission according to claim 6, further comprising:

a first solenoid valve which is capable of outputting a first signal pressure; and a first switching valve for switching between a state in which the secondary pressure is output to the lock-up clutch and a state in which the secondary pressure is blocked, on the basis of the first signal pressure of the first solenoid valve.

13. The hydraulic control apparatus for an automatic transmission according to claim 12, wherein the gain increasing pressure input device comprises:

a second solenoid valve which is capable of outputting a second signal pressure;

a second oil passage for leading the line pressure to the third oil chamber; and a second switching valve interposed on the second oil passage, for switching the second oil passage between a communicative state and a blocked state on the basis of the second signal pressure.

14. The hydraulic control apparatus for an automatic transmission according to claim 12, wherein the gain increasing pressure input device comprises a first oil passage which inputs the first signal pressure of the first solenoid valve into the third oil chamber.

* * * * *